US011927856B2

(12) United States Patent
Ling et al.

(10) Patent No.: US 11,927,856 B2
(45) Date of Patent: Mar. 12, 2024

(54) DISPLAY PANEL AND DISPLAY DEVICE

(71) Applicant: XIAMEN TIANMA MICRO-ELECTRONICS CO., LTD., Xiamen (CN)

(72) Inventors: Ankai Ling, Xiamen (CN); Limei Zhou, Xiamen (CN); Menglan Chen, Xiamen (CN); Poping Shen, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 221 days.

(21) Appl. No.: 17/612,571

(22) PCT Filed: Jun. 24, 2020

(86) PCT No.: PCT/CN2020/098004
§ 371 (c)(1),
(2) Date: Nov. 19, 2021

(87) PCT Pub. No.: WO2021/248567
PCT Pub. Date: Dec. 16, 2021

(65) Prior Publication Data
US 2022/0308414 A1    Sep. 29, 2022

(30) Foreign Application Priority Data
Jun. 9, 2020   (CN) .......................... 202010515975.3

(51) Int. Cl.
*G02F 1/1362* (2006.01)
*G02F 1/1368* (2006.01)
*G06F 3/041* (2006.01)

(52) U.S. Cl.
CPC .. *G02F 1/136286* (2013.01); *G02F 1/136209* (2013.01); *G02F 1/1368* (2013.01); *G06F 3/0416* (2013.01)

(58) Field of Classification Search
CPC ..................................................... G02F 1/1362
See application file for complete search history.

(56) References Cited

U.S. PATENT DOCUMENTS

2010/0171131 A1   7/2010   Iki
2013/0021542 A1   1/2013   Ito et al.
(Continued)

FOREIGN PATENT DOCUMENTS

CN   103913883   *  7/2011   ........... G02F 1/1335
CN   102890376 A      1/2013
(Continued)

OTHER PUBLICATIONS

Office Action of CN Patent Appliation No. 202010515975.3 dated Jan. 20, 2022.

*Primary Examiner* — Sang V Nguyen
(74) *Attorney, Agent, or Firm* — KILPATRICK TOWNSEND & STOCKTON LLP

(57) ABSTRACT

A display panel and a display device are provided according to embodiments of the application. In the display panel, a first metal electrode layer further includes multiple second metal electrode lines which are located in the same layer as multiple first metal electrode lines. An end of the second metal electrode line is electrically connected with the drain of a thin film transistor; and the other end of the second metal electrode line is electrically connected with the pixel electrode, so that the pixel electrode is electrically connected with the drain of the corresponding thin film transistor through the second metal electrode line. The area occupied by the electric connection region of the pixel electrode and the drain of the corresponding thin film transistor is reduced (Continued)

and the display area of the display panel is increased, when the size and the thickness of the display panel are not increased.

17 Claims, 9 Drawing Sheets

(56)  References Cited

U.S. PATENT DOCUMENTS

| | | | |
|---|---|---|---|
| 2014/0197413 A1* | 7/2014 | Liu | H01L 29/78678 257/59 |
| 2016/0018703 A1 | 1/2016 | Wang et al. | |
| 2016/0062196 A1* | 3/2016 | Takahashi | G02F 1/136286 349/143 |
| 2016/0187695 A1* | 6/2016 | Cho | H01L 27/124 349/12 |
| 2016/0291750 A1 | 10/2016 | Chai et al. | |
| 2016/0315130 A1* | 10/2016 | Kajiyama | H10K 59/124 |
| 2017/0277008 A1* | 9/2017 | Jiang | G02F 1/133512 |
| 2017/0307923 A1* | 10/2017 | Hwang | G02F 1/13338 |
| 2017/0329173 A1* | 11/2017 | Ding | G06F 3/0412 |
| 2018/0348554 A1* | 12/2018 | Zhou | G02F 1/1343 |
| 2020/0004078 A1* | 1/2020 | Yabuki | G02F 1/13452 |
| 2020/0285090 A1* | 9/2020 | Tanaka | H10K 50/81 |

FOREIGN PATENT DOCUMENTS

| | | |
|---|---|---|
| CN | 103700669 A | 4/2014 |
| CN | 103913883 A | 7/2014 |
| CN | 103926760 A | 7/2014 |
| CN | 104698709 A | 6/2015 |
| CN | 105785679 A | 7/2016 |
| CN | 106802507 A | 6/2017 |
| CN | 111665668 A | 9/2020 |
| JP | 2010169912 A | 8/2010 |

* cited by examiner

DISPLAY PANEL AND DISPLAY DEVICE

This application is a national stage of International Application No. PCT/CN2020/098004, filed on Jun. 24, 2020, which claims priority to Chinese Patent Application No. 202010515975.3, titled "DISPLAY PANEL AND DISPLAY DEVICE", filed on Jun. 9, 2020 with the China National Intellectual Property Administration, both of which are incorporated herein by reference in their entireties.

FIELD

The present application relates to the field of display technology, and in particular to a display panel and a display device with the display panel.

BACKGROUND

With the development of display technology, the application of the display panel is more and more popular, and people have a higher requirement on the display panel. Specifically, the display panel includes an opening region for displaying an image and a non-opening region for disposing some elements such as wirings, pixel circuits. In the case that the display panel has a fixed size, the larger the area of the non-opening region, the smaller the area of the opening region of the display panel, the smaller an effective display area of the display panel, and the lower the aperture ratio of the display panel. Therefore, on the premise that the size of the display panel is not increased, the display area of the display panel is increased, to increase the aperture ratio of the display panel to be a problem to be solved.

SUMMARY

In order to solve the above problem, a display panel and a display device with the display panel are provided according to embodiments of the present disclosure, to increase the display area of the display panel without increasing the size of the display panel, to increase the aperture ratio of the display panel.

In order to solve the above problem, the following embodiments of the present disclosure are provided.

A display panel includes:
- a first substrate, and a second substrate opposite to the first substrate;
- scanning lines and data lines located on a side of the first substrate facing the second substrate, and the scanning lines and the data lines cross to define pixel regions;
- thin film transistors located on the side of the first substrate facing the second substrate, and the thin film transistors are in one-to-one correspondence with the pixel regions;
- a first metal electrode layer located on a side of the thin film transistors facing away from the first substrate, and the first metal electrode layer includes first metal electrode lines and second metal electrode lines;
- a pixel electrode layer and a common electrode layer located on a side of the first metal electrode layer facing away from the first substrate, and the pixel electrode layer includes pixel electrode units, the pixel electrode units are in one-to-one correspondence with the pixel regions, and the common electrode layer includes common electrode units;
- and each of the first metal electrode lines is electrically connected to a respective common electrode unit of the common electrode units, to provide a common voltage signal to the respective common electrode unit in a first time period, and to provide a touch driving signal to the respective common electrode unit in a second time period; each of the second metal electrode lines has an end electrically connected to a drain of a respective thin film transistor of the thin film transistors, and the other end electrically connected to a respective pixel electrode unit of the pixel electrode units.

A display device includes: the display panel described above and a backlight module, and the display panel modulates light provided by the backlight module to display an image.

Compared with the conventional technology, the above embodiments has the following advantages.

In the display panel according to embodiments of the present application, the common electrode layer includes common electrode units, and the first metal electrode layer includes first metal electrode lines. Each first metal electrode line is electrically connected to a respective common electrode unit, to provide a common voltage signal to the common electrode unit in a first time period and provide a touch driving signal to the common electrode unit in a second time period. In this way, the common electrode unit is reused as a touch electrode unit, so that the thickness of the display panel is not increased as much as possible when the display panel has the touch function. Thus, the above solution is applicable to the development of light and thin display panels.

In addition, in the display panel according to the embodiments of the present application, the first metal electrode layer further includes second metal electrode lines, one end of the second metal electrode line is electrically connected to the drain of the thin film transistor, and the other end of the second metal electrode line is electrically connected to the pixel electrode, so that the pixel electrode is electrically connected to the drain of the corresponding thin film transistor through the second metal electrode line. The area occupied by an electrical connection region of the pixel electrode and the drain of the corresponding thin film transistor is decreased. A problem that a via hole for electrically connecting the pixel electrode and the drain of the corresponding thin film transistor has a large area to decrease a display area of the display panel is solved. In this way, in the premise that the size of the display panel is not increased, the area of the non-opening region of the display panel is reduced, the area of the opening region of the display panel is increased, and the aperture ratio of the display panel is increased.

In addition, in the display panel according to the embodiments of the present application, the second metal electrode line and the first metal electrode line are located in the same layer. In this way, in the premise that the thickness of the display panel is not increased, an area occupied by the via hole for electrically connecting the pixel electrode and the drain of the corresponding thin film transistor is reduced, and the area of the non-opening region of the display panel is reduced. Thus, the purpose of increasing the display area of the display panel is achieved on the premise of not increasing the size of the display panel.

BRIEF DESCRIPTION OF THE DRAWINGS

In order to more clearly illustrate the embodiments of the present application or the conventional technology, the drawings required in the description or the conventional technology will be briefly described below. The drawings in the following description are merely some embodiments of the present application.

DETAILED DESCRIPTION

The embodiments of this application will be clearly and completely described below with reference to the accompanying drawings in the embodiments of this application. The described embodiments are merely a part of the embodiments of this application, rather than all of the embodiments.

In the following description, numerous specific details are set forth in order to facilitate a thorough understanding of the present application, but the present application may also be implemented in other ways other than those described herein, and therefore the present application is not limited by the specific embodiments disclosed below.

As described in background, how to increase the display area of the display panel on the premise of not increasing the size of the display panel is a problem to be solved.

The inventor has found that with the development of touch technology, more and more display panels begin to integrate with the touch function. Although the common electrodes of the display panel are divided into multiple common electrode units and the common electrode units are multiplexed as the touch electrodes, the display panel can integrate with the touch function and the thickness of the display panel does not increased so much. However, compared with an integrated common electrode, in a solution that multiple common electrode units divided from the common electrode are reused as the touch electrode, one electrode wiring layer is added, so that a distance between the pixel electrode and the corresponding thin film transistor is increased, an area occupied by the via hole for electrically connecting the pixel electrode and the corresponding thin film transistor is increased, and the display area of the display panel is decreased.

Figure 1:
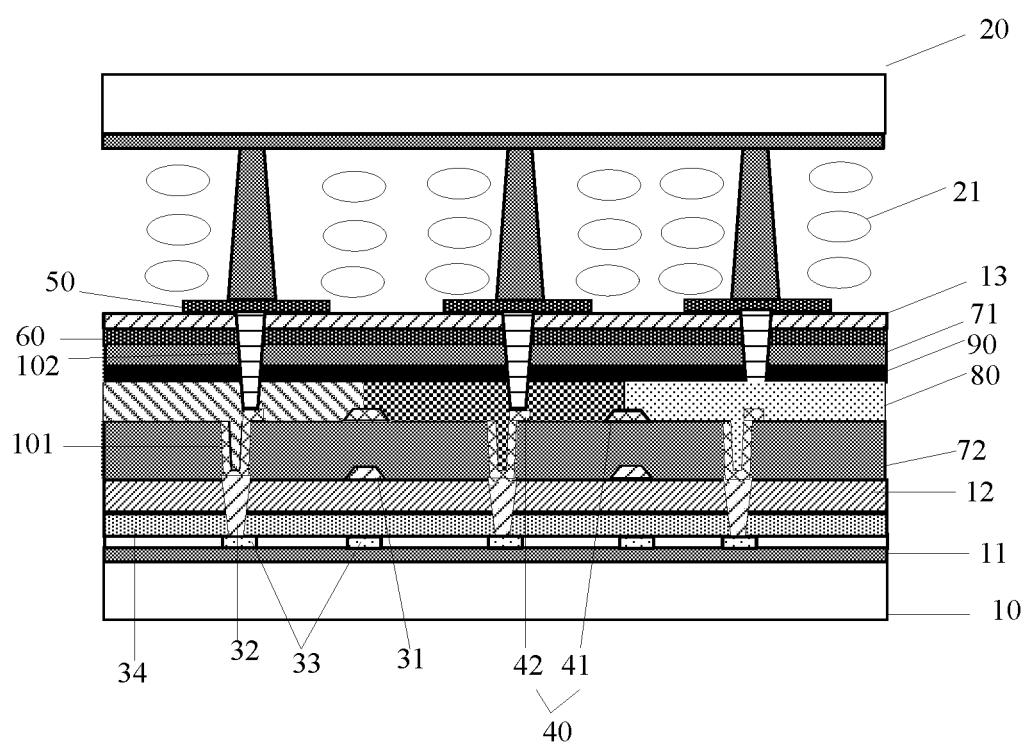
FIG. 1 is a partial schematic structural diagram of a display panel according to an embodiment of this application.
Figure 2:
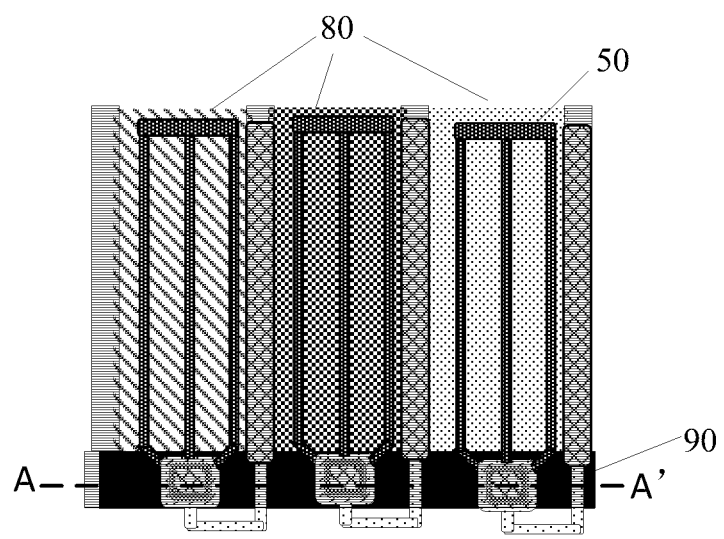
FIG. 2 is a partial top view of the display panel corresponding to FIG. 1.

In view of this, a display panel is provided according to an embodiment of this application. As shown in FIG. 1 and FIG. 2, FIG. 1 is a cross-sectional view of FIG. 2 taken along the AA'. The display panel includes: a first substrate 10, and a second substrate 20 opposite to the first substrate 10.

In one embodiment, a liquid crystal layer 21 may be provided between the first substrate 10 and the second substrate 20. The first substrate 10 is a substrate for providing a support, such as, a glass substrate; and the second substrate 20 may be a rigid substrate such as a glass substrate, or may be a flexible substrate, which will not be limited in the present application.

Figure 3:
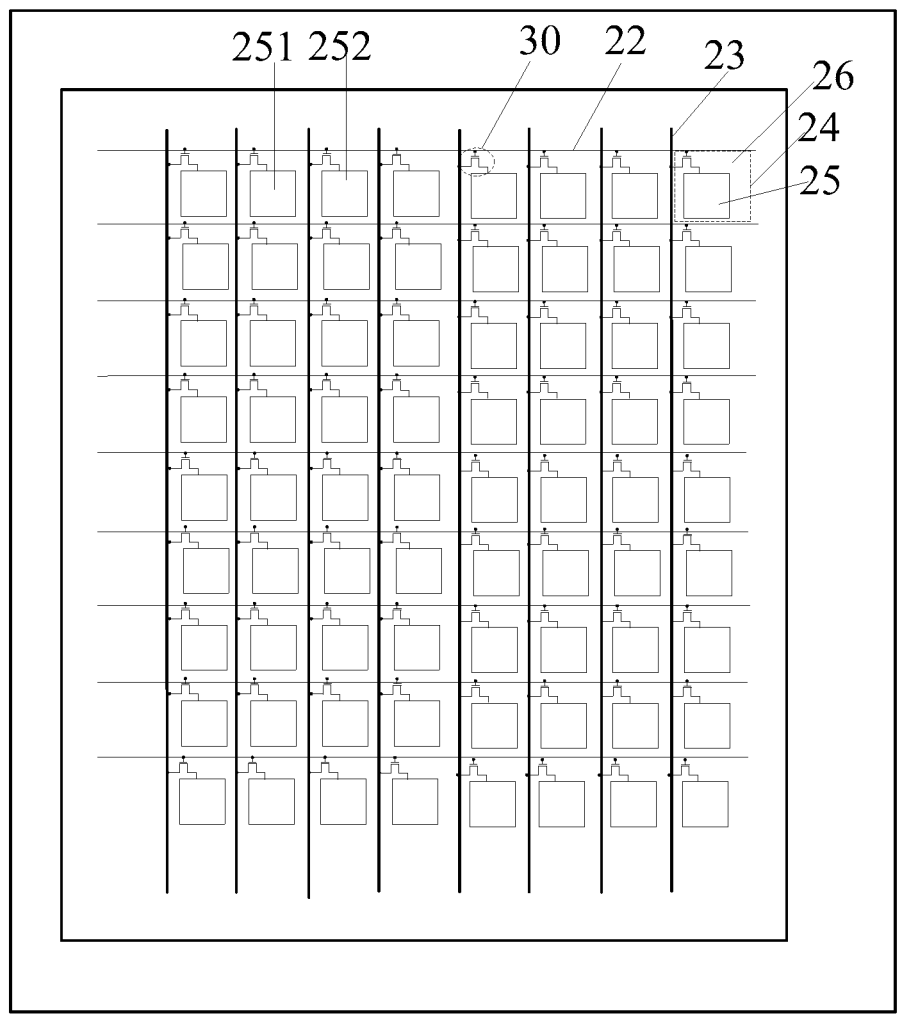
FIG. 3 is a top view of a display panel according to an embodiment of this application.

The display panel further includes: multiple scanning lines and multiple data lines located on a side of the first substrate 10 facing the second substrate 20. As shown in FIG. 3, the scanning lines 22 and the data lines 23 cross to define multiple pixel regions 24. In one embodiment, the scanning lines 22 and the data lines 23 are vertically arranged to define multiple pixel regions 24 arranged in an array, which will not be limited herein and can be designed based on actual situations.

The display panel further includes: multiple thin film transistors 30 located on the side of the first substrate 10 facing the second substrate 20. The thin film transistors 30 are in one-to-one correspondence with the pixel regions 24. In one embodiment, each of the thin film transistors 30 includes a source 31, a drain 32 and a gate (not shown). The source 31 is connected to the drain 32 through a channel layer 33, and a gate insulating layer 34 is provided between the channel layer 33 and the gate.

The display panel further includes: a first metal electrode layer 40 located on a side of the thin film transistor 30 facing away from the first substrate 10. The first metal electrode layer 40 includes multiple first metal electrode lines 41 and multiple second metal electrode lines 42.

The display panel further includes: a pixel electrode layer 50 and a common electrode layer 60 which are located on a side of the first metal electrode layer 40 facing away from the first substrate 10. The pixel electrode layer 50 includes multiple pixel electrode units. The pixel electrode units are in one-to-one correspondence with the pixel regions 24. The common electrode layer 60 includes multiple common electrode units.

In an embodiment, the first metal electrode line 41 is electrically connected to the common electrode unit, to provide a common voltage signal to the common electrode unit in a first time period, and provide a touch driving signal to the common electrode unit in a second time period. One end of the second metal electrode line 42 is electrically connected to the drain 32 of the thin film transistor 30, and the other end thereof is electrically connected to the pixel electrode unit.

It should be noted that, in the embodiment of this application, the pixel region 24 includes an opening region 25 for displaying an image, and a non-opening region 26 located around the opening region 25 and configured to provide elements such as thin film transistors 30 and electrical connection wirings.

In an embodiment of this application, the display panel further includes: a buffer layer 11 located between the first substrate 10 and the thin film transistor 30; an interlayer insulating layer 12 located on a side of the gate facing away from the buffer layer 11 and covering the gate; and a passivation layer 13 located between the pixel electrode layer 50 and the common electrode layer 60.

It should be noted that, in an embodiment of this application, the display panel includes multiple display units, and the display units are in one-to-one correspondence with the pixel regions, which are located in opening regions of the respective pixel regions.

In one embodiment, in an embodiment of the present application, the multiple display units include three-color display units, i.e., a red display unit, a green display unit, and a blue display unit. In another embodiment of the present application, the multiple display units include four-color display units, i.e., a red display unit, a green display unit, a blue display unit, and a white display unit, which will not be limited herein. In the following, the display panel provided by the embodiment of the present application will be described by taking the multiple display units including the three-color display unit of the red display unit, the green display unit and the blue display unit as an example.

In a display panel according to an embodiment of the present application, the common electrode layer includes multiple common electrode units. The first metal electrode layer includes multiple first metal electrode lines. The first metal electrode line is electrically connected to the common electrode unit, to provide a common voltage signal to the common electrode unit in the first time period, and provide a touch driving signal to the common electrode unit in the second time period. In this way, the common electrode unit is reused as a touch electrode unit, so that the thickness of the display panel is not increased as much as possible when the display panel has the touch function. Thus, the above solution is applicable to the development of light and thin display panels.

In addition, in the display panel according to an embodiment of the present application, the first metal electrode layer further includes multiple second metal electrode lines. One end of the second metal electrode line is electrically connected to the drain of the thin film transistor, and the other end of the second metal electrode line is electrically connected to the pixel electrode. In this way, the pixel electrode is directly electrically connected to the drain of the corresponding thin film transistor through the second metal electrode line. The area occupied by an electrical connection region of the pixel electrode and the drain of the corresponding thin film transistor is decreased, an area of a non-opening region of the pixel region is decreased and an area of an opening region of the pixel region is increased. A problem that a via hole for electrically connecting the pixel electrode and the drain of the corresponding thin film transistor has a large area to decrease a display area of the display panel is solved. In this way, in the premise that the size of the display panel is not increased, the display area of the display panel is reduced.

In addition, in the display panel according to an embodiment of the present application, the second metal electrode line and the first metal electrode line are located on the same layer. In this way, in the premise that the thickness of the display panel is not increased, an area occupied by the electrical connection region of the pixel electrode and the drain of the corresponding thin film transistor is reduced, and the area of the non-opening region of the pixel region is reduced, and the area of the opening region of the pixel region is increased. Thus, the purpose of increasing the display area of the display panel is achieved on the premise of not increasing the size of the display panel.

It should be noted that, in an embodiment of this application, in a region corresponding to one pixel region including a green display unit, a red display unit, and a blue display unit in the display panel, the first metal electrode layer generally includes three metal electrode lines. One of the first metal electrode lines is electrically connected to the common electrode unit, to provide a driving signal to the common electrode unit, which is the first metal electrode line in the embodiment of the present application. The other two of the first metal electrode lines are idle metal electrode lines, which are referred to as dummy metal electrode lines, so that the metal electrode lines in the first metal electrode layer are uniformly distributed in the display panel, to improve the display uniformity.

In one embodiment, in an embodiment of the present application, the second metal electrode line is reused as the dummy metal electrode line located in the same layer as the first metal electrode line in the display panel, to increase the display area of the display panel without increasing the number of wires in the display panel.

On the basis of any one of the above embodiments, in one embodiment of the present application, the display panel further includes: a color resist layer and a light shielding layer.

The color resist layer is located on a side of the first substrate facing the second substrate. The color resist layer is located between the common electrode layer and the source/drain of the thin film transistor in a direction from the first substrate to the second substrate, to be arranged on a side of the first substrate facing the second substrate.

The light shielding layer is located on a side of the color resist layer facing away from the first substrate, to shield boundary regions of different color resists in the color resist layer to reduce color interference.

On the basis of the above embodiments, in an embodiment of the present application, as shown in FIG. 1, a first planarization layer 71 is provided between the color resist layer 80 and the common electrode layer 60, and a second planarization layer 72 is provided between the color resist layer 80 and the source/drain of the thin film transistor 60, to improve the planarization degree of forming surfaces of the common electrode layer 60 and the pixel electrode layer 50. In an embodiment of this application, the first metal electrode layer 40 is located between the second planarization layer 72 and the color resist layer 80 to set the color resist layer 80 between the first metal electrode layer 40 and the pixel electrode layer 50, to reduce parasitic capacitance between the pixel electrode layer 50 and the first metal electrode layer 40.

On the basis of the above embodiment, in an embodiment of the present application, the light shielding layer 90 is located between the color resist layer 80 and the first planarization layer 71, such that the light shielding layer 90 is located on a side of the first metal electrode layer 40 facing away from the first substrate 10. In this way, the first metal electrode layer can be shielded by the light shielding layer, to avoid the phenomenon of light reflection caused by external light irradiation on the metal electrode line. In an embodiment, a projection of the light shielding layer 90 on the first substrate 10 completely covers a projection of the first metal electrode layer 40 on the first substrate 10, so that the light shielding layer 90 can completely shield the first metal layer 40.

Figure 4:
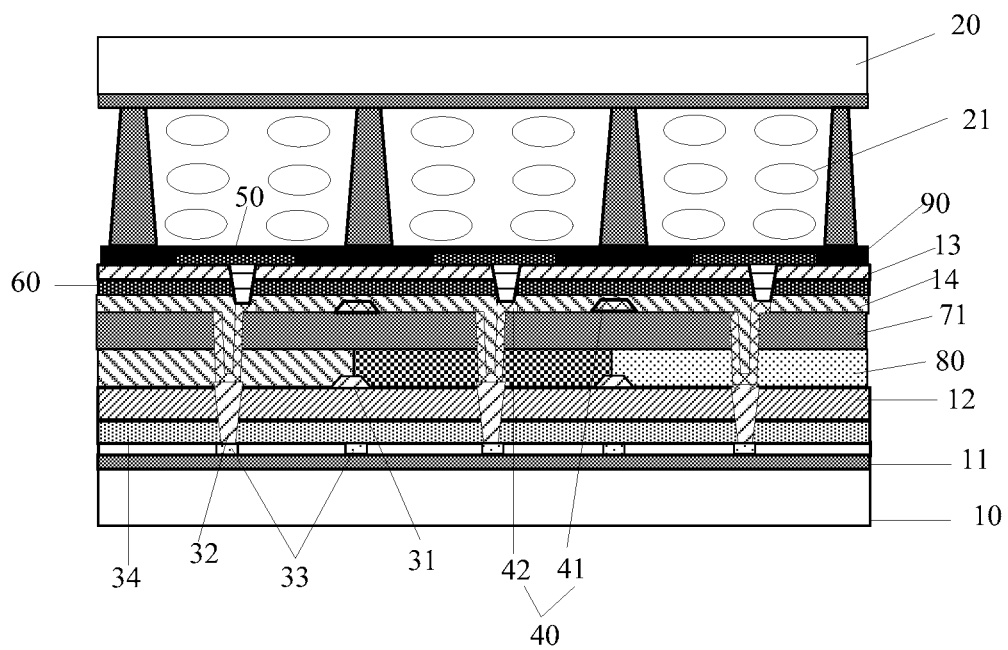
FIG. 4 is a schematic structural diagram of a display panel according to another embodiment of this application.

In another embodiment of the present application, as shown in FIG. 4, a first planarization layer 71 is provided between the color resist layer 80 and the common electrode layer 60, and the color resist layer 80 is located on a surface of the source/drain of the thin film transistor 30 facing away from the first substrate 10. The embodiment of the application differs from the previous embodiment in that the display panel includes only one planarization layer, i.e., the first planarization layer, to reduce the thickness of the display panel, but the present application is not limited thereto.

In an embodiment of this application, the first metal electrode layer 40 is located between the first planarization layer 71 and the common electrode layer 60, to reduce the influence of the color resist layer on the planarization degree of forming surfaces of the common electrode layer and the pixel electrode layer. It should be noted that, in an embodiment of the application, an insulating layer 14 is further provided between the first metal electrode layer 40 and the common electrode layer 60 to ensure electrical insulation between the first metal electrode layer 40 and the common electrode layer 60. It should also be noted that the planarization layer has a large thickness, the insulating layer has a small thickness, that is, the thickness of the insulating layer 14 is smaller than the thickness of the second planarization layer. Therefore, the thickness of the display panel provided by this embodiment of the present application is smaller than that provided by the previous embodiment.

On the basis of the above embodiment, in an embodiment of the present application, the light shielding layer 90 is located between the first metal electrode layer 40 and the common electrode layer 60. Thus, the first metal electrode layer 40 can be shielded by the light shielding layer 90, to avoid the phenomenon of light reflection caused by external light irradiation on the metal electrode line. In an embodiment, the projection of the light shielding layer 90 on the first substrate 10 completely covers the projection of the first metal electrode layer 40 on the first substrate 10, so that the light shielding layer 90 can completely shield the first metal layer 40.

On the basis of any one of the above embodiments, in an embodiment of the present application, the light shielding layer 90 may be located on a side of the pixel electrode layer 50 facing away from the first substrate 10, as shown in FIG. 4. The location of the light shielding layer 90 will not be limited herein, as long as it is ensured that the light shielding layer 90 is located on a side of the first metal electrode layer 40 facing away from the first substrate, to prevent external light from being irradiated to the metal electrode line to cause a reflection phenomenon.

As shown in FIG. 1 again, in any one of the above embodiments, a first end of the second metal electrode line 42 is electrically connected to the drain 32 of the thin film transistor 30 through a first via hole 101, and a second end of the second metal electrode line 42 is electrically connected to the pixel electrode unit through a second via hole 102.

It should be noted that when the via hole is too deep and the side wall of the via hole is too steep, the electrode layer formed on the side wall of the via hole is easy to crack, the electrical connection performance of the via hole region is bad. On the contrary, if the side wall of the via hole is gentle, the electrode layer formed on the sidewall of the via hole is not easy to crack, the electrical connection performance of the via hole region is good, but the area of the display panel occupied by the via hole is large. Therefore, in an embodiment of this application, the first end of the second metal electrode line is electrically connected with the drain of the thin film transistor through the first via hole, and the second end of the second metal electrode line is electrically connected with the pixel electrode unit through the second via hole, to realize the electrical connection between the pixel electrode and the drain of the corresponding thin film transistor through the second metal electrode line, the first via hole and the second via hole. In addition, compared with the direct electrical connection between the pixel electrode and the drain of the corresponding thin film transistor, the area occupied by the electrical connection region of the pixel electrode and the drain of the corresponding thin film transistor can be reduced in the embodiment, to reduce the area of the non-opening region of the pixel region, increasing the area of the opening region of the pixel region, and increasing the display area of the display panel without increasing the size of the display panel.

On the basis of the above embodiment, in an embodiment of the present application, a projection of the first via hole on the first substrate and a projection of the second via hole on the second substrate do not overlap. Thus, a relatively large via hole depth of an overlapping region of the first via hole and the second via hole is avoided when the first via hole and the second via hole have the overlapping region, which may results in an inability to simultaneously take into account the electrical connection performance of the electrode layer on the sidewall of the via hole and the occupied area of the via hole.

On the basis of the above embodiment, in an embodiment of the present application, as shown in FIG. 3, the multiple pixel regions includes a first opening region 251 and a second opening region 252 adjacent to the first opening region 251. The first opening region 251 and the second opening region 252 are display image regions of the display panel. A projection of the second via hole on the first substrate is located between the first opening region 251 and the second opening region 252, and the second via hole does not occupy the opening region of the display panel, to further increase the display area of the display panel without increasing the size of the display panel. In other words, the area of the region for displaying the image in the display panel is further increased.

On the basis of the above embodiment, in an embodiment of the present application, the projection of the second via hole on the first substrate is at least partially overlapped with the projection of the scanning line on the first substrate. In this way, the area between the first opening region and the second opening region is not increased as much as possible, on the basis of the second via hole disposed between the first opening region and the second opening region. That is, on the basis of ensuring that the second via hole is disposed on the non-opening region of the display panel, the area of the non-opening region of the display panel is not increased as much as possible.

In an embodiment, the projection of the second via hole on the first substrate is completely covered by the projection of the scanning line on the first substrate. In this way, the area between the first opening region and the second opening region is not increased on the basis of the second via hole disposed between the first opening region and the second opening region. That is, on the basis of ensuring that the second via hole is disposed on the non-opening region of the display panel, the area of the non-opening region of the display panel is not increased.

In another embodiment of the present application, the projection of the second via hole on the first substrate and the projection of the data line on the first substrate at least partially overlap. In this way the area between the first opening region and the second opening region is not increased as much as possible on the basis of the second via hole disposed between the first opening region and the second opening region. That is, on the basis of ensuring that the second via hole is disposed on the non-opening region of the display panel, the area of the non-opening region of the display panel is not increased as much as possible.

In an embodiment, the projection of the second via hole on the first substrate is completely covered by the projection of the data line on the first substrate. In this way, the area between the first opening region and the second opening region is not increased on the basis of the second via hole disposed between the first opening region and the second opening region. That is, on the basis of ensuring that the second via hole is disposed on the non-opening region of the display panel, the area of the non-opening region of the display panel is not increased.

It should be noted that the width of the light shielding layer has a wider width in an extension direction of the data line, and a narrower width in an extension direction of the scanning line. That is, a portion, parallel to the extension direction of the scanning line, in the light shielding layer has a wider width in the extension direction of the data line, which is generally 20 micrometers or more; and a portion, parallel to the extension direction of the data line, in the light shielding layer has a narrower width in the extension direction of the scanning line, which is generally 5 and 6 micrometers.

Therefore, in an embodiment of the present application, in a direction perpendicular to the first substrate, the second via hole is located in an overlapping region of a cover region of a portion of the light shielding layer in a direction parallel to the extension direction of the scanning line and a cover region of a portion of the light shielding layer in the extension direction of the data line. In this way, the area occupied by the second via hole is increased as much as possible, on the basis of not reducing the area of the opening region of the display panel, to improve the electrical connection performance of the second via region. However, the location of the second via hole is not limited in this application, which will be determined based on actual situations.

Figure 5:
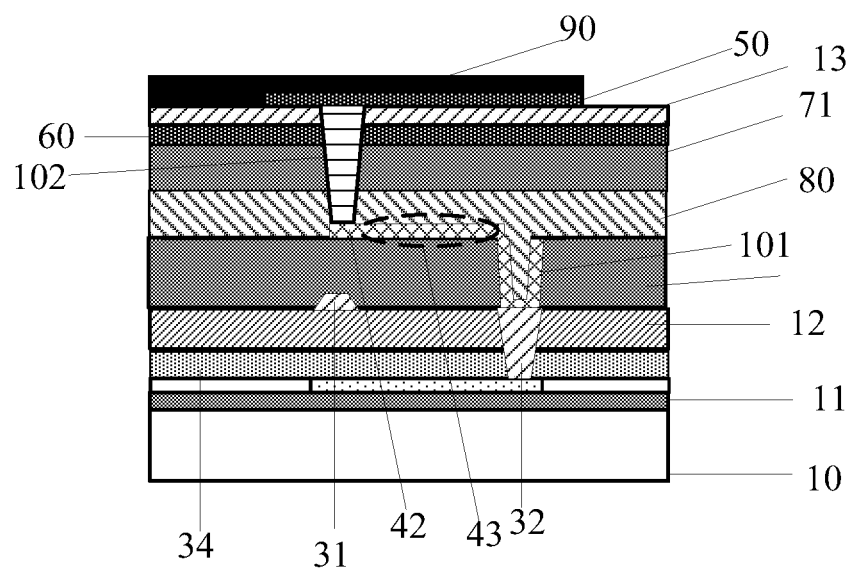
FIG. 5 is a partial schematic structural diagram of a display panel according to another embodiment of this application.
Figure 6:
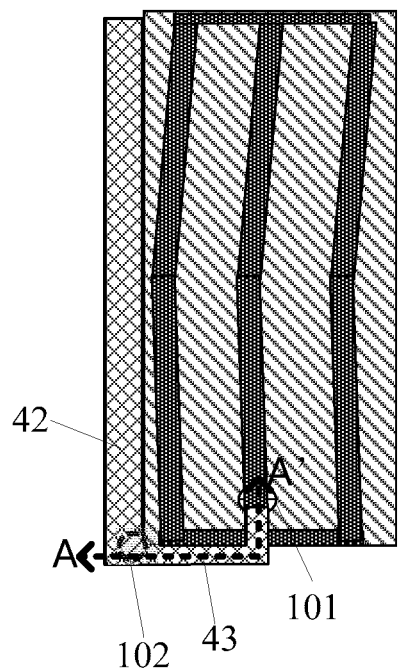
FIG. 6 is a partial top view of the display panel corresponding to FIG. 5.

On the basis of any one of the above embodiments, in an embodiment of the present application, FIG. 5 is a cross-sectional view of FIG. 6 taken along a direction of AA'. As shown in FIG. 5 and FIG. 6, the first metal electrode layer further includes: a third metal electrode line 43 arranged parallel to the extension direction of the data line. A projection of the first via hole 101 on the first substrate 10 and a projection of the third metal electrode line 43 on the first substrate 10 at least partially overlap. The first via hole 101 is electrically connected to the second metal electrode line 42 through the third metal electrode line 43, Thus, the second via hole 102 does not occupy the area of the opening region of the pixel region when disposed in the extension direction of the data line, and the first via hole 101 can still be electrically connected to the second metal wire.

Figure 7:
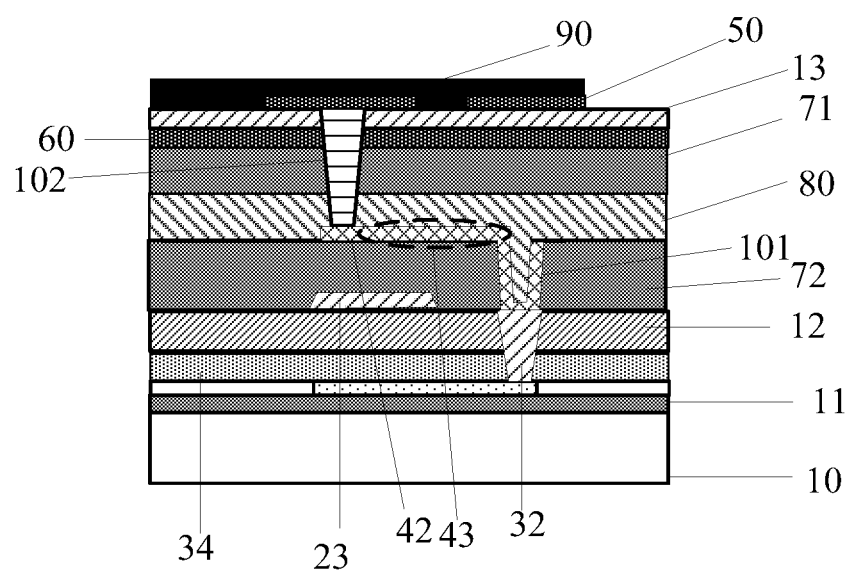
FIG. 7 is a partial schematic structural diagram of a display panel according to still another embodiment of this application.
Figure 8:
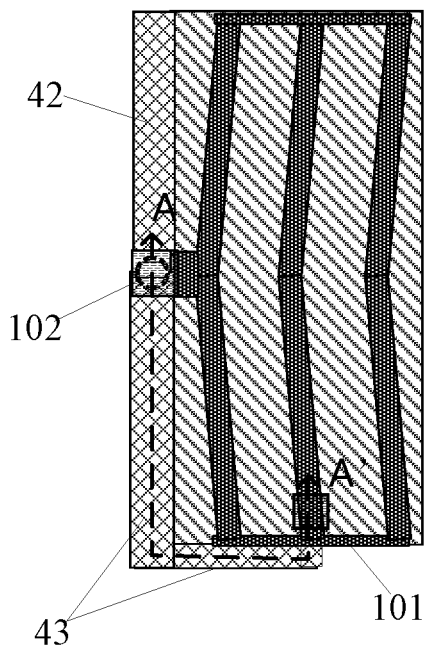
FIG. 8 is a partial top view of the display panel corresponding to FIG. 7.

In another embodiment of the present application, FIG. 7 is a cross-sectional view of FIG. 8 taken along a direction of AA'. In the embodiment of this application, as shown in FIG. 7 and FIG. 8, the first metal electrode layer further includes: a third metal electrode line 43 arranged parallel to the extension direction of the data line. A projection of the first via hole 101 on the first substrate 10 and a projection of the third metal electrode line 43 on the first substrate 10 at least partially overlap. The first via hole 101 is electrically connected to the second metal electrode line 42 through the third metal electrode line 43. Thus, the second via hole 102 does not occupy the area of the opening region of the pixel region when disposed in the extending direction of the data line 23, and the first via hole 101 can still be electrically connected to the second metal wire.

The embodiment of this application differs from the previous embodiment in that the projection of the second via hole 102 on the first substrate 10 is not located in an overlapping region of the projection of the data line on the first substrate 10 and the projection of the scanning line on the first substrate 10, but is located in a projection region of only data line on the first substrate. That is, the second via hole 102 is not located in the overlapping region of the covering region of the portion of the light shielding layer in a direction parallel to the extension direction of the scanning line and the covering region of the portion of the light shielding layer in the extension direction of the data line, but is only located in a covering region of a portion of the light shielding layer in the extension direction of data line 23. In an embodiment, in the direction parallel to the extension direction of the data line, a distance between the second via hole and one end of the corresponding pixel region along the extension direction of the data line is equal to a distance between the second via hole and the other end of the corresponding pixel region along the extension direction of the data line, which will not be limited herein, and determined based on actual situations.

Figure 9:
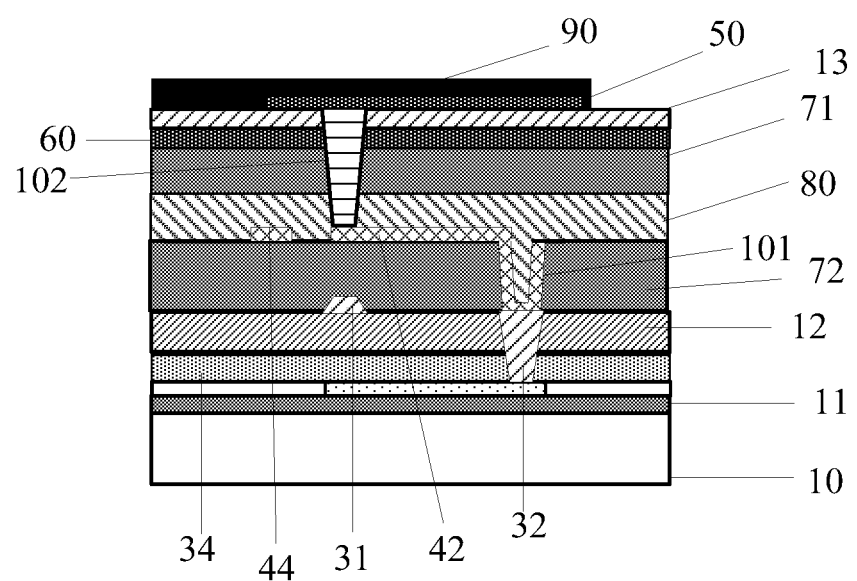
FIG. 9 is a partial schematic structural diagram of a display panel according to yet another embodiment of this application.
Figure 10:
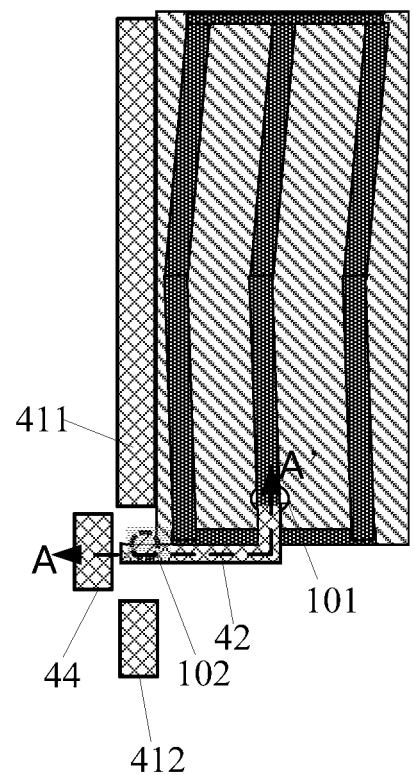
FIG. 10 is a partial top view of the display panel corresponding to FIG. 9.

In another embodiment of the present application, FIG. 9 is a cross-sectional view of FIG. 10 taken along a direction of AA'. In this embodiment, as shown in FIG. 9 and FIG. 10, the first metal electrode line includes a first portion 411 parallel to the extension direction of the data line, and a second portion 412 parallel to the extension direction of the data line. A projection of the second via hole 102 on the first substrate 10 is located between a projection of the first portion 411 on the first substrate 10 and a projection of the second portion 412 on the first substrate 10, and is insulated from the first portion 411 and the second portion 412. In an embodiment of the present application, the first metal electrode line includes a metal connecting line 44. The first portion 411 and the second portion 412 are electrically connected through the metal connecting line 44. Thus, in the case that the second via hole 102 is disposed at a position of the first metal electrode line, the first metal electrode line is divided into the first portion 411 and the second portion 412, and the first portion 411 and the second portion 412 are electrically connected through the metal connecting line 44. In this way, when the second via hole is disposed at the position of the first metal electrode line, normal transmission of the signal of the first metal electrode line may still be ensured.

It should be noted that, in an embodiment of this application, the second metal electrode line is not reused as the dummy metal electrode line located on the same layer as the first metal electrode line, but is an additional metal electrode line arranged in the first metal electrode layer. As shown in FIG. 9 and FIG. 10, one end of the metal electrode line (i.e., the second metal wiring 42 in the present embodiment) is located directly above the drain of the thin film transistor, and electrically connected to the drain of the thin film transistor through the first via hole 101. The other end of the metal electrode line is located above the data line (or the source 31), and electrically connected to the pixel electrode unit through the second via hole 102.

It should also be noted that, in an embodiment of the application, the metal connecting wire is located on the first metal electrode layer, so that the first portion and the second portion of the first metal electrode line are electrically connected through the metal connecting wire disposed in the same layer as the first metal electrode line. The introduction of the metal connecting line will not increase the thickness of the display panel.

On the basis of any one of the above embodiments, in an embodiment of the present application, the projection of the second via hole on the first substrate is at least partially overlapped with the projection of the source of the thin film transistor on the first substrate. Thus, the second via hole is reused as at least part of a region of the source of the thin film transistor, to avoid the increase of the area between the first opening region and the second opening region when the second via hole is disposed above the data line between the first opening region and the second opening region.

Figure 11:
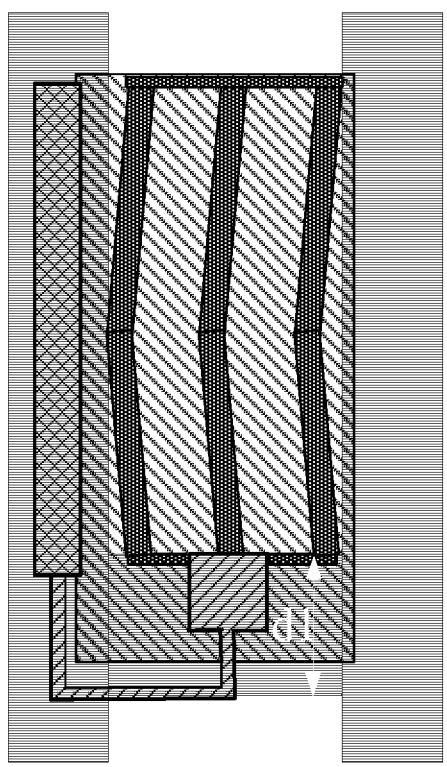
FIG. 11 is a top view of a light shielding layer corresponding to one pixel region in a conventional display panel.
Figure 12:
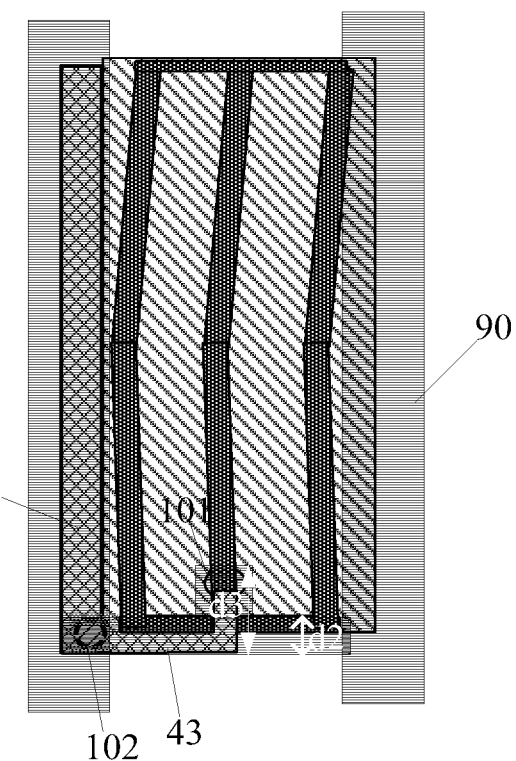
FIG. 12 is a top view of a light shielding layer corresponding to one pixel region when a second via hole is disposed between a first opening region and a second opening region in a display panel according to an embodiment of this application.

As shown in FIG. 11 and FIG. 12, FIG. 11 is a top view of a light shielding layer corresponding to one pixel region in a conventional display panel, and FIG. 12 is a top view of a light shielding layer corresponding to one pixel region when the second via hole is disposed between the first opening region and the second opening region. In the conventional technology, a width d1 of a horizontal portion of the light shielding layer (i.e., a portion parallel to the extension direction of the scanning line) ranges from 25 μm to 35 μm. In the display panel provided in the embodiments of this application, when the second via hole 102 is disposed between the first opening region and the second opening region, a width of a horizontal portion of the light shielding layer 90 (i.e., a portion parallel to the extension direction of the scanning line) includes a first component part and a second component part. The first part extends along the extension direction of the data line to cover the first via hole, the width d3 of the first part ranges from 20 μm to 30 μm. The second part is located on two sides of the first part, and the width d2 of the second part ranges from 8 μm to 20 μm.

It can be seen therefrom that the display panel according to the embodiments of the present application can reduce the width of the horizontal portion of the light shielding layer, to increase the area of the opening region on the premise that the area of the display panel is unchanged.

On the basis of any one of the above embodiments, in an embodiment of the present application, the pixel unit includes multiple pixel electrodes parallel to each other. The multiple pixel electrodes are electrically connected to each other. The pixel electrode is located in the opening region of the corresponding pixel region, and the length of the pixel electrode in the extension direction of the data line is not less than the length of the opening region corresponding to the pixel electrode in the extension direction of the data line. In this way, in the extension direction of the data line, a whole opening region in which the pixel electrode is located can be covered by the pixel electrode, and the area of the region for displaying the image in the display panel is increased by increasing the length of the pixel electrode.

Figure 13:
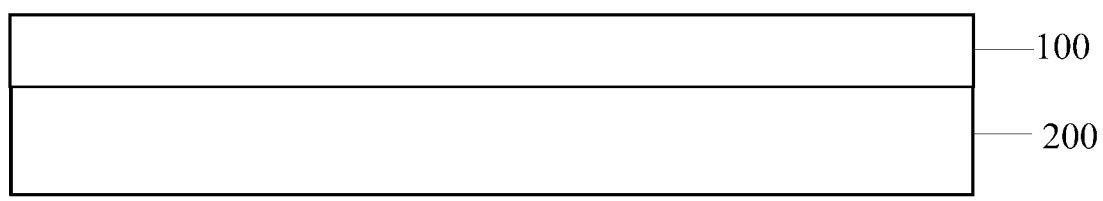
FIG. 13 is a schematic structural diagram of a display device according to an embodiment of this application.

In addition, a display device is provided according to an embodiment of the present application. As shown in FIG. 13, the display device includes a display panel 100 and a backlight module 200. The display panel 100 is a display panel according to any one of the above embodiments, which is configured to modulate the light provided by the backlight module 200 to display an image.

It should be noted that the related description of the display panel has been described in the above embodiments, which will not be repeated in the present application.

In summary, in the display panel and the display device according to the embodiments of the present application, the common electrode layer includes multiple common electrode units, and the first metal electrode layer includes multiple first metal electrode lines. The first metal electrode line is electrically connected to the common electrode unit, to provide a common voltage signal to the common electrode unit in a first time period and provide a touch driving signal to the common electrode unit in a second time period. In this way, the common electrode unit is reused as a touch electrode unit, so that the thickness of the display panel is not increased as much as possible when the display panel has the touch function. Thus, the above solution is applicable to the development of light and thin display panels.

In addition, in the display panel and the display device according to the embodiments of the present application, the first metal electrode layer further includes multiple second metal electrode lines. One end of the second metal electrode line is electrically connected to the drain of the thin film transistor, and the other end of the second metal electrode line is electrically connected to the pixel electrode, so that the pixel electrode is electrically connected to the drain electrode of the corresponding thin film transistor via the second metal electrode line. The area occupied by an electrical connection region of the pixel electrode and the drain of the corresponding thin film transistor is decreased. A problem that a via hole for electrically connecting the pixel electrode and the drain of the corresponding thin film transistor has a large area to decrease a display area of the display panel is solved. In this way, the area of the non-opening region of the display panel is reduced, and the area of the opening region of the display panel is increased. In the premise that the size of the display panel is not increased, the display area of the display panel is increased.

In addition, in the display panel and the display device according to the embodiments of the present application, the second metal electrode line and the first metal electrode line are located in the same layer. In this way, in the premise that the thickness of the display panel is not increased, the area occupied by the electrical connection region of the pixel electrode and the thin film transistor corresponding to the pixel electrode is reduced, the area of the non-opening region of the pixel region is reduced, and the area of the opening region of the pixel region is increased. Thus, the purpose of increasing the display area of the display panel is achieved on the premise of not increasing the size of the display panel The various parts in this specification are described by means of a parallel manner in combination with a progressive manner, and each part focuses on the difference from other parts, and the same similar parts between the parts can be seen with reference to each other.

What is claimed is:

1. A display panel, comprising:
  a first substrate;
  a second substrate opposite to the first substrate;
  a plurality of scanning lines and a plurality of data lines located on a side of the first substrate facing the second substrate, wherein the plurality of scanning lines and the plurality of data lines cross to define a plurality of pixel regions;
  a plurality of thin film transistors located on the side of the first substrate facing the second substrate, wherein the plurality of thin film transistors are in one-to-one correspondence with the plurality of pixel regions;
  a first metal electrode layer located on a side of the plurality of thin film transistors facing away from the first substrate, wherein the first metal electrode layer comprises a plurality of first metal electrode lines and a plurality of second metal electrode lines; and
  a pixel electrode layer and a common electrode layer located on a side of the first metal electrode layer facing away from the first substrate, wherein the pixel electrode layer comprises a plurality of pixel electrode units, the plurality of pixel electrode units are in one-to-one correspondence with the plurality of pixel regions, and the common electrode layer comprises a plurality of common electrode units, wherein each of the plurality of first metal electrode lines is electrically connected to a respective common electrode unit of the plurality of common electrode units, to provide a common voltage signal to a common electrode unit in a first time period, and provide a touch driving signal to the common electrode unit in a second time period, wherein each of a plurality of second metal electrode line has a first end electrically connected to a drain of the thin film transistor, and a second end electrically connected to the pixel electrode unit, wherein each of the plurality of second metal electrode line comprises a first end electrically connected to the drain of the thin film transistor through a first via hole, and a second end electrically connected to the pixel electrode unit through a second via hole, wherein each of the plurality of first metal electrode lines comprises a first part parallel to an extension direction of the data line of the plurality of data lines and a second part parallel to the extension direction of the data line of the plurality of data lines;

the projection of the second via hole on the first substrate is located between a projection of a first portion on the first substrate and a projection of the second portion on the first substrate, and the second via hole is insulated from the first portion and the second portion; and the first metal electrode layer further comprises a metal connecting line, and the first portion and the second portion are electrically connected by means of the metal connecting wire.

2. The display panel according to claim 1, wherein a projection of the first via hole on the first substrate does not overlap with a projection of the second via hole on the first substrate.

3. The display panel according to claim 2, wherein the plurality of pixel regions comprise a first opening region, and a second opening region adjacent to the first opening region, the first opening region and the second opening region are image display regions of the display panel, and the projection of the second via hole on the first substrate is located between the first opening region and the second opening region.

4. The display panel according to claim 3, wherein the projection of the second via hole on the first substrate and a projection of a scanning line of the plurality of scanning lines on the first substrate at least partially overlap.

5. The display panel according to claim 3, wherein the projection of the second via hole on the first substrate and a projection of a data line in the plurality of data lines on the first substrate at least partially overlap.

6. The display panel according to claim 5, wherein the first metal electrode layer further comprises a third metal electrode line parallel to an extension direction of the data line, the projection of the first via hole on the first substrate and the projection of the third metal electrode line on the first substrate at least partially overlap, and a second metal electrode line of the plurality of second metal electrode lines is electrically connected to the drain of the thin film transistor through the third metal electrode line and the first via hole.

7. The display panel according to claim 6, wherein the projection of the second via hole on the first substrate and a projection of a source of the thin film transistor on the first substrate at least partially overlap.

8. The display panel according to claim 1, wherein each of the plurality of pixel electrode units comprises a plurality of pixel electrodes parallel to each other, the plurality of pixel electrodes in one pixel electrode unit of the plurality of pixel electrode units are electrically connected to each other; each of the plurality of pixel electrodes is located in an opening region of a respective pixel region, and a length of each of the plurality of pixel electrodes in an extension direction of a data line of the plurality of data lines is not less than a length of the opening region corresponding to the pixel electrode in the extension direction of the data line of the plurality of data lines.

9. The display panel according to claim 1, further comprising:

a color resist layer located on the side of the first substrate facing the second substrate, wherein the color resist layer is located between the common electrode layer and sources or drains of the plurality of thin film transistors in a direction from the first substrate to the second substrate; and a light shielding layer located on a side of the color resist layer facing away from the first substrate, wherein a projection of the light shielding layer on the first substrate covers a projection of the first metal electrode layer on the first substrate.

10. The display panel according to claim 9, wherein a first planarization layer is provided between the color resist layer and the common electrode layer, and a second planarization layer is provided between the color resist layer and the sources or the drains of the plurality of thin film transistors.

11. The display panel according to claim 10, wherein the first metal electrode layer is located between the second planarization layer and the color resist layer.

12. The display panel according to claim 9, wherein a first planarization layer is provided between the color resist layer and the common electrode layer, and the color resist layer is located on a surface of the sources or the drains of the plurality of thin film transistors away from the first substrate.

13. The display panel according to claim 12, wherein the first metal electrode layer is located between the first planarization layer and the common electrode layer.

14. The display panel according to claim 13, wherein the light shielding layer is located between the first metal electrode layer and the common electrode layer.

15. The display panel according to claim 9, wherein the light shielding layer is located on a side of the pixel electrode layer facing away from the first substrate.

16. A display device, comprising: a display panel and a backlight module, wherein the display panel is configured to modulate light provided by the backlight module to display an image, and the display panel comprises:

a first substrate;

a second substrate opposite to the first substrate;

a plurality of scanning lines and a plurality of data lines located on a side of the first substrate facing the second substrate, wherein the plurality of scanning lines and the plurality of data lines cross to define a plurality of pixel regions;

a plurality of thin film transistors located on the side of the first substrate facing the second substrate, wherein the plurality of thin film transistors are in one-to-one correspondence with the plurality of pixel regions;

a first metal electrode layer located on a side of the plurality of thin film transistors facing away from the first substrate, wherein the first metal electrode layer comprises a plurality of first metal electrode lines and a plurality of second metal electrode lines; and a pixel electrode layer and a common electrode layer located on a side of the first metal electrode layer facing away from the first substrate, wherein the pixel electrode layer comprises a plurality of pixel electrode units, the plurality of pixel electrode units are in one-to-one correspondence with the plurality of pixel regions, and the common electrode layer comprises a plurality of common electrode units, wherein each of the plurality of first metal electrode lines is electrically connected to a respective common electrode unit of the plurality of common electrode units, to provide a common voltage signal to a common electrode unit in a first time period, and provide a touch driving signal to the common electrode unit in a second time period, wherein each of the plurality of second metal electrode line has a first end electrically connected to a drain of the thin film transistor, and a second other end electrically connected to the pixel electrode unit, wherein each of the plurality of second metal electrode line comprises a first end electrically connected to the drain of the thin film transistor through a first via hole, and a second end electrically connected to the pixel electrode unit through a second via hole, wherein each of the plurality of first metal electrode lines comprises a first part parallel to an extension direction of the data line of the plurality of data lines and a second part parallel to the extension direction of the data line of the plurality of data lines;

the projection of the second via hole on the first substrate is located between a projection of a first portion on the first substrate and a projection of the second portion on the first substrate, and the second via hole is insulated from the first portion and the second portion; and the first metal electrode layer further comprises a metal connecting line, and the first portion and the second portion are electrically connected by means of the metal connecting wire.

17. The display panel according to claim 1, wherein the projection of the second via hole on the first substrate and a projection of a source of the thin film transistor on the first substrate at least partially overlap.

* * * * *